Feb. 5, 1924.
C. N. STONE
1,482,528
CHAIN OR BELT TIGHTENER
Filed April 3, 1922
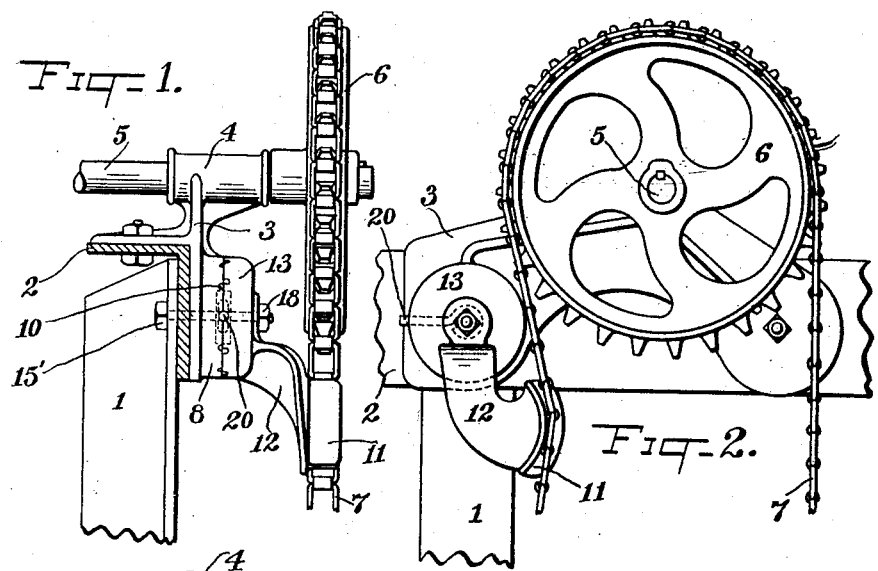
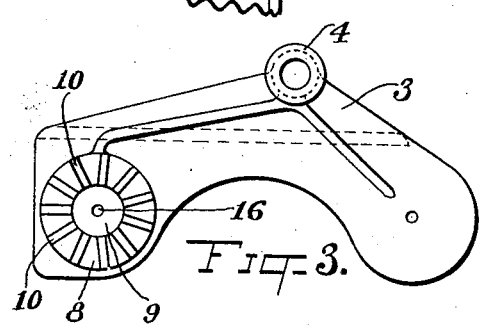
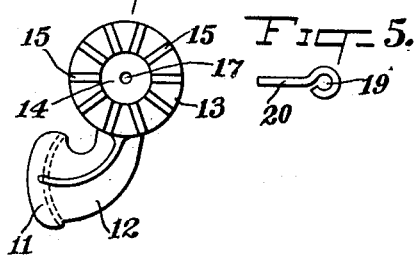
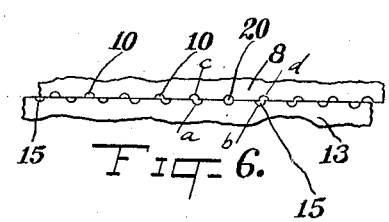
Witness:
E. Wilderson
Inventor:
Charles N. Stone
by W. C. Jirdinster
Attorney.

Patented Feb. 5, 1924.

1,482,528

UNITED STATES PATENT OFFICE.

CHARLES N. STONE, OF MOLINE, ILLINOIS, ASSIGNOR TO DEERE & COMPANY, OF MOLINE, ILLINOIS, A CORPORATION OF ILLINOIS.

CHAIN OR BELT TIGHTENER.

Application filed April 3, 1922. Serial No. 549,283.

*To all whom it may concern:*

Be it known that I, CHARLES N. STONE, a citizen of the United States, residing at Moline, in the county of Rock Island and State of Illinois, have invented certain new and useful Improvements in Chain or Belt Tighteners, of which the following is a specification, reference being had therein to the accompanying drawings.

My invention relates to devices known as tighteners and commonly utilized for the purpose of taking up wear or slackness of chains or belts employed in mechanical structures for the purpose of communicating motion from one part to another, and the object of my invention is to provide a fine and positive adjustment of the tightener to compensate for any degree of slack or looseness in the chain or belt with which the tightener is used.

Referring to the drawings in which similar numerals indicate identical parts—

Figure 1 is a side elevation of a sprocket and chain with my device in proper relation therewith. Figure 2 is a front elevation of Figure 1. Figure 3 is a front view of the sprocket support embodying one of the parts of my device. Figure 4 is a view illustrating a second part of my device and the part of the tightener adapted to contact with a chain or belt. Figure 5 is the key pin or bolt, and Figure 6 is an isometrical projection illustrating the relative position of grooves in the adjusting parts of my device.

In the drawings 1 and 2 indicate parts of structure having rigidly bolted thereon a bracket 3; a bearing 4 is preferably integral with the bracket 3, and journaled in the bearing 4 is a shaft 5 on which is mounted a sprocket 6. A sprocket chain 7 leads over the sprocket 6 to some other part of a mechanism not shown in the drawing. Preferably integral with the bracket 3, and projecting from one end of the face thereof is a circular member 8 having a central recess 9. On the face of the member 8, and extending from the recess 9 to the periphery of the member 8, is a series of radial grooves 10, eleven in number in this instance.

That part of the tightener which is adjustable comprises a shoe 11 adapted to bear against the chain 7; the shoe 11 is preferably integral with an arm 12 extending outwardly and downwardly from a circular member 13 similar in form and dimensions to the member 8. A recess 14 is central in the member 13 and extending from it to the periphery of the member 13 is a series of radial grooves 15 ten in number. The grooved faces of the members 8 and 13 are in constant contact, the two members 8 and 13 being held together by a bolt 15' which extends through the parts 1 and 2, and through a central hole 16 in the member 8 and a similar hole 17, in the center of the member 13, and is threaded to receive a nut 18 by the operation of which the members 8 and 13 are held rigidly together, or held loosely for purpose of adjustment. The recesses 9 and 14 form a receptacle for the head of a key bolt loosely held therein by the bolt 15' which passes through an eye 19 in the key bolt. The shank 20 of the key bolt is adapted to fit in the grooves of the members 8 and 13 to lock them firmly together from rotary movement.

The parts being assembled, as shown in Figures 1 and 2, and it is desired to increase or diminish the pressure of the shoe 11 against the chain 7, I first loosen the nut 18 until the member 13 is free of the key bolt; the member 13 is then rotated on the bolt 15' until one of the grooves 15 in the member 13 registers with one of the grooves 10 in the member 8, the direction of rotation of the member 13 depending upon the desire to increase or lessen the pressure of the shoe 11 on the chain 7. As before stated there are eleven grooves in the member 8 and ten in the member 13, consequently it follows that, after the members 8 and 13 have been separated a sufficient distance to free the key bolt from the grooves in both members, a rotary movement of the member 13 in the desired direction, for 1/110 of the circumference, will bring the groove $a$ or the groove $b$, according to the direction of rotation of the member 13, to register with the groove $c$ or the groove $d$ in the member 8. If greater adjustment is required the member 13 is rotated until the desired pressure of the shoe 11 on the chain 7 has been obtained, the key bolt is then placed in the grooves in the members 8 and 13 which register and the nut is turned to hold the two members rigidly together.

It will be understood that by this construction I obtain a delicacy of adjustment which is very desirable and effective; and it also is apparent that my device can be applied to a belt by substituting a roller for the shoe 11. I do not limit myself however to the proportion of 10 and 11 in the members 8 and 13, for it can be varied to a greater or less degree.

What I claim is—

1. In a device of the character described, the combination with a support, of two circular members mounted on the support and having plane surfaces opposed and normally in contact, one of said members rigid with said support and the second member rotatably adjustable, a series of radial grooves in the plane surface of each member, means to hold said members together, means interlocking with two directly opposite grooves to hold the adjustable member from rotation, and an arm extending from said adjustable member and movable therewith.

2. In a device of the character described, the combination with a support, of two circular members mounted on the support and having plane surfaces opposed and normally in contact, one of said members rigid with said support and the second member rotatably adjustable, a series of radial grooves in the plane surface of each member, one of said surfaces having a lesser number of grooves than the other, means to hold said members together, means interlocking with two opposite grooves to hold the adjustable member from rotation, and an arm extending from said adjustable member and movable therewith.

3. In a device of the character described, the combination with a support, of two circular members mounted on the support and having plane surfaces opposed and normally in contact, one of said members rigid with said support and the second member rotatably adjustable, a series of radial grooves in the plane surface of each member, a receptacle central of said members, means to hold said members together, means pivotally supported in said receptacle and extending radially to interlock with two opposite grooves to hold said adjustable member from rotation, and an arm extending from said adjustable member and movable therewith.

4. In a device of the character described, the combination with a support, of two circular members mounted on the support and having plane surfaces opposed and normally in contact, one of said members rigid with the support and the second member rotatably adjustable, a series of radial grooves in the plane surface of each member, one of said surfaces having a lesser number of grooves than the other, a receptacle central of said members, means to hold said members together, means pivotally supported in said receptacle and extending radially to interlock with two opposite grooves to hold said adjustable member from rotation, and an arm extending from said adjustable member and movable therewith.

5. In a device of the character described, the combination with a support, of two circular members mounted on the support and having plane surfaces opposed and normally in contact, one of said members rigid with said support and the second member rotatably adjustable, a series of radial grooves in the plane surface of each member, a receptacle central of said members, a bolt extending through said members and recess and operating to hold said members together, a key pivotally mounted on said bolt within the receptacle and extending radially of said members for interlocking engagement with two opposite grooves to hold said adjustable member from rotation, and an arm extending from said adjustable member and movable therewith.

6. In a device of the character described, the combination with a support, of two circular members mounted on the support and having plane surfaces opposed and normally in contact, one of said members rigid with said support and the second member rotatably adjustable, a series of radial grooves in the plane surface of each member, one of said surfaces having a lesser number of grooves than the other, a receptacle central of said members, a bolt extending through said members and receptacle and operating to hold said members together, a key pivotally mounted on said bolt within the receptacle and extending radially of said members for interlocking engagement with two opposite grooves to hold said adjustable member from rotation, and an arm extending from said adjustable member and movable therewith.

7. In a device of the character described, the combination with a support, of two circular members mounted on the support and having plane surfaces opposed and normally in contact, a series of radial grooves in the plane surface of each member, one of said surfaces having a lesser number of grooves than the other, one of said members rigid on said support and the second member rotatably adjustable, means to interlock with two opposite grooves to hold said adjustable member from rotation and adapted to be released therefrom to permit adjustment of said member, and an arm extending from said adjustable member and movable therewith.

CHARLES N. STONE.